Patented Feb. 19, 1952

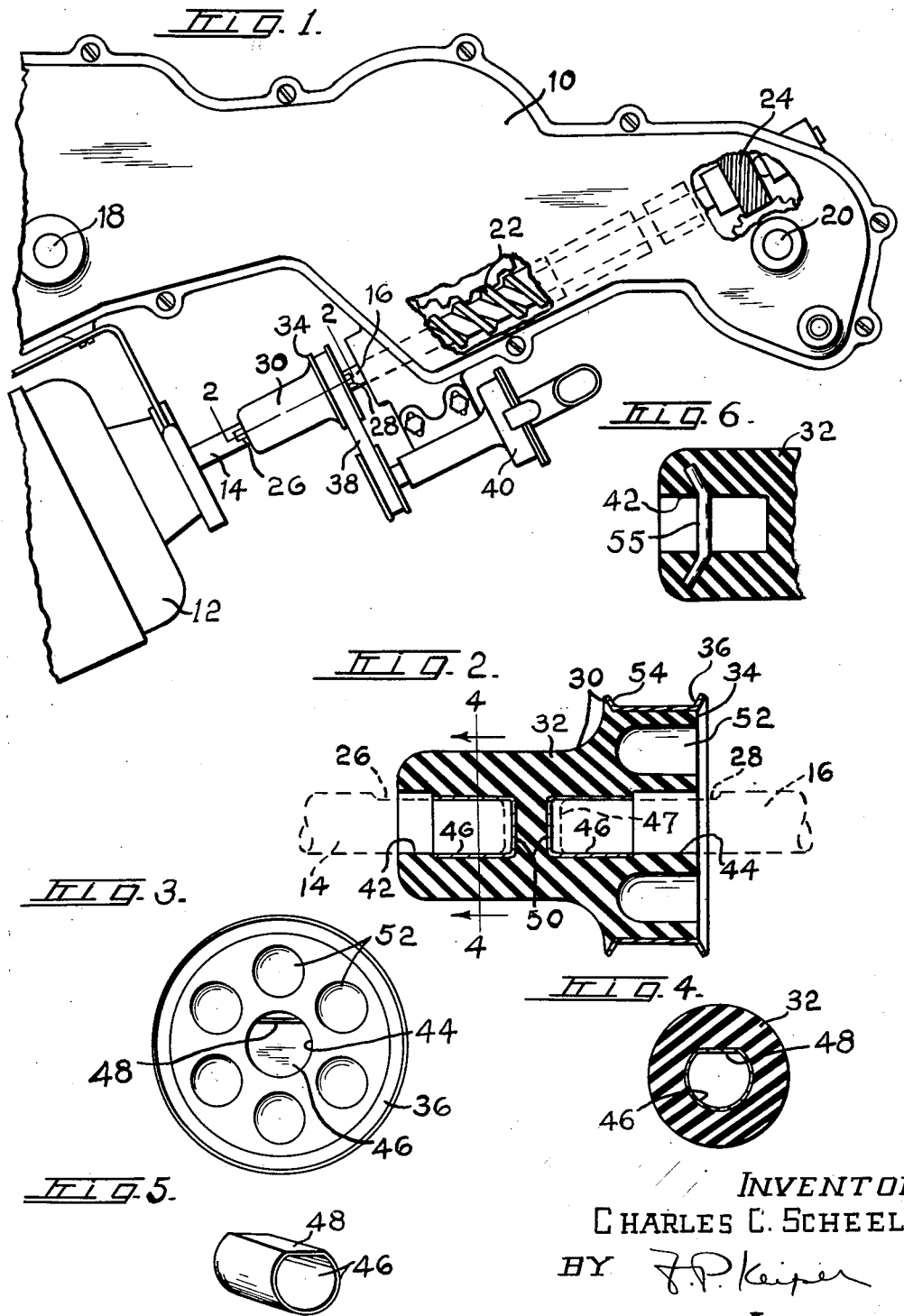

2,586,567

UNITED STATES PATENT OFFICE 2,586,567

FLEXIBLE COUPLING

Charles C. Scheele, Syracuse, N. Y., assignor to Easy Washing Machine Corporation, Syracuse, N. Y., a corporation of Delaware Application September 16, 1947, Serial No. 774,245

7 Claims. (Cl. 64—11)

This invention relates to flexible couplings, and more particularly to flexible couplings having provision for overload release and power takeoff through a coupling-carried driving sheave or the like.

In various motor driven appliances, such as washing machines and the like, wherein fractional horsepower motors are required to be coupled to various driven mechanisms with auxiliary devices such as a pump or the like, it is desirable to provide a coupling which may adequately carry the safe continuous load of the motor, while at the same time being adapted to release the motor when heavily overloaded or in the event the driven mechanism should jam. In such an arrangement, the relatively expensive motor may be protected from damage while the coupling providing for such release may be replaced upon correction of the overloading or defective condition in the driven mechanism.

The present invention is constituted by a rubber-like sleeve member, circular in cross section, having metallic sleeve or thimble-like substantially axial aligned receptacles flattened or otherwise provided with means for receiving and being keyed to opposed substantially aligned driving and driven shafts. The rubber-like member additionally may carry an auxiliary driving sheave or other similar driving element, the same being so positioned as to load one or the other of the driving and driven shafts.

An object of the invention particularly is to provide a unitary resilient coupling structure which may be readily employed to couple substantially aligned shafts, and at the same time to provide an auxiliary drive sheave.

Another object of the invention is to provide in such unitary structure shaft thin gauge metallic sleeves having shaft keying means adapted to readily yield upon substantial unwarranted torsional overload.

Still another object of the invention is to provide a unitary coupling which will allow the coupled shafts to freely move axially without end thrust being imposed upon the shafts, or particularly the motor shaft, which in starting may require some end play.

A further object of the invention is to provide a structure which may be readily fabricated from rubber-like material with the various metallic elements thereof positioned or embedded upon or in the rubber-like portion, with adequate bonding between such elements.

The above and other novel features of the invention will appear more fully hereinafter from the following detailed description when taken in conjunction with the accompanying drawings. It is expressly understood, however, that the drawings are employed for purposes of illustration only and are not designed as a definition of the limits of the invention, reference being had for this purpose to the appended claims.

In the drawings, wherein like reference characters indicate like parts,

Figure 1 is a fragmentary view in plan of a motor and appliance mechanism employing the coupling of the invention;

Figure 2 is a transverse section through such a coupling taken substantially on the line 2—2 of Figure 1;

Figure 3 is an end elevation of the coupling;

Figure 4 is a transverse section taken substantially on the line 4—4 of Figure 2;

Figure 5 is a perspective view of a shaft-receiving thimble employed in the coupling; and Figure 6 is a modified form of coupling arrangement.

As shown in Figure 1, a frame or housing 10 has mounted thereon an electric motor 12 in such a position that the motor drive shaft 14 is in substantial alignment with a shaft 16 projecting from the housing 10, and adapted to be driven by the motor 12. The housing 10 may be the transmission employed in a washing machine of the type shown in the patent to Geldhof No. 2,111,143, there being several vertical spindles 18 and 20 driven by the shaft 16 through worm drives 22 and 24, respectively.

The adjacent ends of the shafts 14 and 16, as shown in Figure 2, are spaced from one another and are provided with flats 26 and 28. The shafts are in substantial alignment, and the one adapted to be driven by the other, and accordingly are provided with a coupling 30.

The unitary coupling member 30 of the present invention comprises a body portion 32 formed of rubber-like material having a degree of resilience but otherwise of a hardness similar to vulcanized rubber employed in vehicle tires having a durometer hardness in the order of around 50–75. The body portion is circular in cross section, and is enlarged at one end as at 34 to support an auxiliary drive element in the form, as illustrated, of a rim 36 of a flanged sheave adapted to receive a flat belt 38 for driving an auxiliary device such as the centrifugal pump 40.

The body portion 32 is provided with aligned recesses 42 and 44 extending inwardly from either end, in which are positioned sleeve or thimble-like members 46. Each thimble member (see Figure 5) is a cylindrical with a flattened side 48, and preferably has an end wall 50. The interior cross sectional shape of such thimble is such as to snugly engage the ends of the respective shafts 14 and 16 and the flats 26 and 28 formed thereon, or such other keying arrangement as may be provided. The fit, however, is such as to permit some end play between the shafts, the shaft ends in practice being spaced from the thimble ends 50 as at 47.

The thimbles are positioned within the body portion at the time of molding, and in the molding process are bonded to the body portion so that the surrounding body portion tends to resiliently support the thimble and resiliently maintain the thimble shape, that is with its flattened side 48. The thimble may be formed of sheet metal, the gauge being such as to maintain the shape of the thimble during transmission of power and torque within the safe limits for which the motor 12 is designed. The metal may be brass plated or otherwise treated to facilitate bonding of the rubber-like material thereto. When the power transmitted or the torque exceeds such limits, the thimble is such as to be distorted, thereby allowing the flat 48 to round out, thus permitting the shaft received therein to rotate free of the otherwise destructive load, improperly imposed on the motor. Such improper load, for example, could result from a clogged pump, or other cause. The enlarged end 34 of the body portion of the coupling is molded within the rim 36 of the sheave, which may be formed of any suitable sheet metal capable of a ready bond with the rubber-like material of the body portion. The body portion may be provided with a plurality of recesses 52 extending endwise around the recess 44 and beneath the rim 36, in order to assist in the proper curing of the enlarged end 34 of the body portion 32, and to facilitate the bonding of the body portion to the sheave, it being understood that mold projections in the manufacturing process will form the apertures 52 and conduct curing heat to the interior of the enlarged portion 34 immediately adjacent the sleeve and sheave shown.

It will be appreciated that the rim 36 may be flanged as at 54, which flange may also have one or both outer faces thereof bonded to the body portion. It will also be observed that in the form shown the rim is positioned over and preferably towards the end of the coupling member so as to be substantially directly supported by a single one of the opposed shafts. As thus positioned, such sheave does not tend to detract from the flexibility of the central flexing of the body portion. Thus, the coupling is adapted to permit a small degree of disalignment between the shafts because of its inherent flexibility due to the yielding rubber-like material of which it is composed.

The coupling sleeve may take various forms, for example, square, hexagonal, as may seem desirable. In some instances, a cross pin 55 molded in the rubber as is shown in Figure 6 may be employed, in which case the shaft will be axially slotted to embrace the pin. The sleeve form may be employed on one end while the pin form may be employed on the other, as may appear desirable.

There has thus been described a unitary coupling and sheave element which may be readily positioned during the assembly of mechanism of the general character of that shown in Figure 1, and which may readily be replaced at relatively low cost. Additionally, the unitary coupling may be cheaply molded so as to form an inexpensive replacement part, in comparison to other parts which would be likely to be damaged in the absence of such a coupling. At the same time, the unitary coupling is adapted to replace constructions heretofore employed which involve a large number of individual parts and which constructions have not afforded the overload release characteristics of the present invention, nor the drive sheave formed as a part of the unitary structure. Such drive sheave is so located as to gain the advantage of the overload release characteristics of at least one of the shaft-receiving thimbles described.

Although a single embodiment of the invention with a single variation thereof has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A power transmitting coupling element comprising a body portion of resilient yielding vulcanized rubber-like material, having aligned spaced shaft-receiving recesses in its opposite ends, shaft-receiving sleeves in said apertures normally aligned on a common axis, and an annular channel member coaxial with said sleeve axes, and arranged about an enlarged diameter portion of said body portion, said sleeves having their outer walls, and said channel member having its inner wall bonded to said rubber-like material over substantially their entire contact areas.

2. A power transmitting coupling element comprising a body portion of yielding rubber-like material, having aligned spaced shaft-receiving recesses in its opposite ends, shaft, receiving sleeves in said apertures normally aligned on a common axis, and an annular sheave rim member coaxially arranged with respect to said sleeve axes, and arranged about an enlarged diameter portion of said body portion, said sleeves having their outer walls, and said rim member having its inner wall bonded to said rubber-like material over substantially their entire contact areas.

3. A power transmitting coupling element comprising a body portion of yielding rubber-like material, having aligned spaced shaft-receiving recesses in its opposite ends, shaft-receiving sleeves in said apertures normally aligned on a common axis, said sleeves having deformable keying means, and an annular sheave rim member coaxially arranged with respect to said sleeve axes, and arranged about an enlarged diameter portion of said body portion, said sleeves having their outer walls, and said rim member having its inner wall bonded to said rubber-like material over substantially their entire contact areas.

4. A power transmitting coupling element comprising a body portion of resilient yielding vulcanized rubber-like material, having aligned spaced shaft-receiving recesses in its opposite ends, shaft-receiving sleeves in said apertures normally aligned on a common axis, each of said sleeves having a keying flat adapted for cooperation with a corresponding drive or driven shaft flat, and being of a strength to resist distortion during normal torque applied thereto by such corresponding drive shaft, and an annular channel member coaxial with said sleeve axes, and arranged about an enlarged diameter portion of said body portion, said sleeves having their outer walls, and said channel member having its inner wall bonded to said rubber-like material over substantially their entire contact areas.

5. A power transmitting coupling element comprising a body portion of yielding rubber-like material having aligned spaced shaft receiving recesses in its opposite ends, shaft coupling means in said apertures including at least one sleeve normally aligned on a common axis, and an annular sheave rim member coaxially arranged with respect to said sleeve axis and arranged about an enlarged diameter portion of said body portion, said sleeve having its outer wall and said rim member having its inner wall bonded to said rubber-like material over substantially its entire contact areas.

6. A power transmitting coupling element comprising a body portion of yielding rubber-like material, having aligned spaced shaft-receiving recesses in its opposite ends, shaft-receiving sleeves in said apertures normally aligned on a common axis, said sleeves having keying means, and an annular sheave rim member coaxially arranged with respect to said sleeve axes, and arranged about an enlarged diameter portion of said body portion, said sleeves having their outer walls, and said rim member having its inner wall bonded to said rubber-like material over substantially their entire contact areas.

7. A power transmitting coupling element comprising a body portion of vulcanized rubber-like material having a durometer hardness in the order of 60, and having aligned spaced shaft-receiving recesses in its opposite ends normally aligned on a common axis, shaft-receiving keying devices in said apertures, one of said devices comprising a shaft-embracing sleeve of irregular internal contour with external surface portions embedded in and bonded to said rubber-like material, said rubber-like material being formed with an enlarged diameter annular pulley rim having at least one flange overlying one of said recesses only.

CHARLES C. SCHEELE.

REFERENCES CITED

The following references are of record in the file of this patent:

UNITED STATES PATENTS

| Number | Name | Date |
|---|---|---|
| 2,271,568 | Olson | Feb. 3, 1942 |
| 2,297,489 | Markes | Sept. 29, 1942 |
| 2,297,619 | Haberstump | Sept. 29, 1942 |

FOREIGN PATENTS

| Number | Country | Date |
|---|---|---|
| 320,594 | Great Britain | 1929 |